United States Patent [19]
Skarnulis

[11] Patent Number: 6,059,301
[45] Date of Patent: May 9, 2000

[54] BABY CARRIAGE AND ADAPTER HANDLE THEREFOR

[76] Inventor: Cynthia L. Skarnulis, 2011 Randolph Ave., St. Paul, Minn. 55105

[21] Appl. No.: 09/004,087

[22] Filed: Jan. 6, 1998

[51] Int. Cl.[7] .................................................. B62B 7/08
[52] U.S. Cl. ................... 280/47.371; 280/642; 280/650; 16/113.1
[58] Field of Search .......................... 280/47.371, 47.36, 280/642, 649, 650, 304.1, 655; 16/113.1, 429

[56] References Cited

U.S. PATENT DOCUMENTS

| | | | |
|---|---|---|---|
| 2,972,488 | 2/1961 | Alsop | 280/47.371 |
| 3,110,504 | 11/1963 | Myers | 280/36 |
| 3,275,337 | 9/1966 | Lau | 280/87.1 |
| 3,503,276 | 3/1970 | Vigot | 74/544 |
| 3,563,601 | 2/1971 | Dickey | 297/390 |
| 3,712,636 | 1/1973 | Gesslein | 280/47.38 |
| 3,797,848 | 3/1974 | Burnham | 280/36 B |
| 4,023,825 | 5/1977 | Kassai | 280/649 |
| 4,180,276 | 12/1979 | Kassai | 280/47.36 |
| 4,220,351 | 9/1980 | Fleischer | 280/647 |
| 4,248,443 | 2/1981 | Ohlson | 280/39 |
| 4,256,325 | 3/1981 | Fleischer | 280/649 |
| 4,345,777 | 8/1982 | Perego | 280/647 |
| 4,632,421 | 12/1986 | Shamie | 280/47.36 |
| 4,634,175 | 1/1987 | Wise | 297/183 |
| 4,660,850 | 4/1987 | Nakao et al. | 280/642 |
| 4,730,759 | 3/1988 | Naidu | 224/158 |
| 4,741,551 | 5/1988 | Perego | 280/642 |
| 4,762,335 | 8/1988 | Kassai | 280/649 |
| 4,832,361 | 5/1989 | Nakao et al. | 280/642 |
| 4,856,744 | 8/1989 | Frankel | 248/215 |
| 4,887,834 | 12/1989 | Cabagnero | 280/642 |
| 4,986,599 | 1/1991 | Wise | 297/183 |
| 5,011,221 | 4/1991 | Wise | 297/191 |
| 5,029,886 | 7/1991 | Takahashi et al. | 280/47.36 |
| 5,046,750 | 9/1991 | Heubl | 280/87.021 |
| 5,048,849 | 9/1991 | Mathews et al. | 280/47.35 |
| 5,056,805 | 10/1991 | Wang | 280/47.36 |
| 5,125,676 | 6/1992 | Teng | 280/47.36 |
| 5,133,567 | 7/1992 | Owens | 280/650 |
| 5,205,578 | 4/1993 | Liu | 280/642 |
| 5,217,240 | 6/1993 | Gardenhour, Jr. et al. | 280/282 |
| 5,230,523 | 7/1993 | Wilhelm | 280/30 |
| 5,244,292 | 9/1993 | Wise | 403/93 |
| 5,249,438 | 10/1993 | Rhaney et al. | . |
| 5,261,690 | 11/1993 | Kluber | 280/648 |
| 5,303,945 | 4/1994 | Oxford | 280/304.1 |
| 5,375,861 | 12/1994 | Gifford | 280/47.38 |
| 5,388,852 | 2/1995 | Bigo et al. | 280/642 |
| 5,417,450 | 5/1995 | Wang | 280/642 |
| 5,421,548 | 6/1995 | Bennett et al. | 280/304.1 |
| 5,622,375 | 4/1997 | Fairclough | 280/642 |
| 5,664,795 | 9/1997 | Haung | 280/47.38 |
| 5,690,196 | 11/1997 | Wang | 16/113.1 |
| 5,806,111 | 9/1998 | Heimbrock et al. | 280/47.371 |

*Primary Examiner*—Michael Mar
*Assistant Examiner*—Lynda Jasmin
*Attorney, Agent, or Firm*—Nawrocki, Rooney & Sivertson

[57] ABSTRACT

A baby carriage construction. The carriage, or stroller, includes a frame which receives within a perimeter defined by the frame an occupant compartment. The occupant compartment has opposite sides, and, spaced along a fore-and-aft axis of the compartment, first and second ends. The first end is positioned forwardly with respect to an intended direction of movement of the stroller, and the second end is positioned rearwardly with respect to that direction. The frame is supported for movement over a surface. The baby carriage also includes a handle which extends laterally from a side of the occupant compartment. Typically, the laterally-extending handle would be positionable at a height accessible to an attendant responsible for the stroller and its occupant. Such an attendant imparts movement to the stroller. The laterally-extending handle is positioned, or positionable, at a location with respect to the fore-and-aft axis of the occupant compartment such that it is forward of the second, aft end of the compartment and, preferably, closer to the first, forward end of the compartment than it is to the second, aft end of the compartment.

5 Claims, 7 Drawing Sheets

BABY CARRIAGE AND ADAPTER HANDLE THEREFOR

TECHNICAL FIELD

The present invention deals broadly with manually pushed, occupant bearing vehicles. More narrowly, however, it is directed to manually pushed baby carriages, strollers and wheelchairs. The specific focus of the invention is motive means which enable such a vehicle to be operated in a safer manner than is traditionally accomplished.

BACKGROUND OF THE INVENTION

A traditional carriage used for pushing babies and toddlers includes a plurality of side stanchions. In most carriage structures, these stanchions enable the overall carriage to be folded into a compact configuration for storage or transportation. The side stanchions of the carriage frame support, in part, a sling or chair portion. The chair portion is mounted within the periphery defined by the frame to define an occupant compartment. Such a compartment is created, in a folding embodiment of a baby carriage, when the carriage is opened to an operational configuration.

The side stanchions of the frame define the width of the vehicle. Typically, a generally U-shaped push handle, having a width substantially the same as that of the carriage frame, extends upwardly and rearwardly from the occupant compartment. When the vehicle is so configured, the carriage or stroller attendant is, as will be able to be seen, located rearwardly of the occupant compartment and the child seated in the compartment. In fact, the attendant is positioned fairly significantly rearward of the forward portions of the carriage.

Such a relationship can create a dangerous situation. For example, where a parent is pushing his or her child in the carriage on a sidewalk and the sidewalk intersects a blind alley such as one where a corner of a building obscures traffic coming out of the alley, the stroller can be well within the path of a vehicle exiting from the alley before the attendant pushing the carriage is even aware of the approach of the vehicle. The degree of danger is, of course, a function of the relative location of the stroller with respect to the buildings straddling the alley. The closer the stroller is to the buildings, the more difficult it is to perceive the approach of a vehicle exiting the alley. That is, because of the location of the attendant pushing the stroller and a close proximity of the stroller to a building on one side of the alley, the attendant may only be able to view a foot, or, at the most, two feet into the alley as the alley is approached.

Even where the stroller is maintained at some distance from a building on one side of an alley, however, the approaching of the stroller to the alley can still be dangerous. While the attendant will be able to see deeper into the alley, the situation might still be such that, if the vehicle is proceeding too fast for conditions, the vehicle exiting the alley might make contact with the stroller before the attendant has an opportunity to react.

As can be seen, these problems in the prior art can result in serious injury to a baby being pushed in the stroller. In the extreme case, a child might even be killed.

It is to these problems and dictates of the prior art that the present invention is directed. It is an improved baby carriage construction and adapter handle which can be retrofitted to a state-of-the-art carriage which solve many of the problems of the prior art.

SUMMARY OF THE INVENTION

The present invention is a manually-propelled vehicle which includes an occupant compartment having opposite sides and a first, forward end positioned forwardly with respect to an intended direction of movement of the vehicle and a second, rearward end positioned rearwardly with respect to an intended direction of movement of the vehicle. The first and second ends are positioned at spaced locations along a fore-and-aft axis of the occupant compartment. Means are provided to support the occupant compartment for movement over a surface. The vehicle also is provided with a motive handle which extends laterally from one of the opposite sides of the compartment for pushing the vehicle in the intended direction.

One application of the vehicle is to be used as a child stroller. In this application, the vehicle is provided with a frame which receives the occupant compartment within a perimeter defined by the frame. In such an application, the motive handle is, typically, disposed at a height which is accessible to a person who is going to impart movement to the stroller. It is intended that the motive handle be located with respect to a fore-and-aft axis of the occupant compartment wherein it is mounted forward of the second end of the occupant compartment and, preferably, closer to the first end of the compartment than to the second end thereof.

In a preferred embodiment, the handle includes a riser portion which has a proximal end typically mounted to the side of the frame of the stroller. The riser portion extends upward typically and, in the preferred embodiment, a handgrip portion of the handle extends from the distal end of the riser portion laterally with respect to a side of the occupant compartment.

One embodiment of the invention envisions a handgrip portion which intersects the distal extremity of the riser portion and is pivotally mounted thereat. Typically, the handgrip portion would be made to extend from the riser portion distal extremity at 90° relative thereto. Means could be provided, however, it is intended, to enable the handgrip portion to be pivoted to a position in alignment, alongside or as an extension, with the riser portion. With the handgrip portion in this disposition, the motive handle would be in a stowed configuration.

An embodiment of the invention envisions a handgrip portion which has a proximal end stepped relative to a distal end of the handgrip portion. The stepping would be so configured such that the distal end would be positioned forwardly of the proximal end. This would enable actual application of force to the motive handle to be made at a location, relative to the occupant compartment, forwardly of the proximal end of the handgrip portion.

As discussed in this document, it is desirable that the motive handle handgrip portion be at a height accessible to an attendant of the stroller. To achieve this goal, the riser portion of the handle can include a plurality of segments disposed for axial telescoping movement relative to each other. While not exclusive, it is envisioned that there would be two telescoping portions, one male and one female, in order to enable height adjustment. Means would be provided to secure the telescoping segments against relative movement once a desired height of the handgrip portion is achieved.

One embodiment of the invention envisions employment of a pin to maintain relative axial positioning of adjacent male and female segments of the handle riser portion. In this embodiment, the female segment is provided with an aperture formed through a wall defining the female segment. The male segment has a plurality of axially-spaced and aligned dimples, and the male portion is rotationally positioned relative to the female portion such that each of the dimples is registrable with the aperture in the female portion. The pin would, typically, be provided with a contoured distal tip so that, when the pin is inserted through the aperture in the female segment, the contoured distal tip of the pin could be received within one of the axially-spaced dimples.

In order to maintain the desired relative positioning of the male and female segments, a leaf spring, secured at a proximal end thereof to the wall defining the female segment, can be made to mount, at its distal end, the pin. The leaf spring would provide a bias to urge the pin through the aperture in the female segment and into one of the dimples in the male segment.

The invention is envisioned as having additional features. For example, in view of the fact that most strollers are provided with collapsible frames, the motive handle could be similarly made collapsible so that it would not have to be removed prior to folding up the stroller.

The present invention envisions additional embodiments. For example, in a traditional stroller, a push handle which includes at least one lateral leg extending upwardly and rearwardly with respect to the occupant compartment is provided. In most strollers, a pair of such handles, parallel to each other, are employed. The lateral legs, together with a crossbar which interconnects upper ends of the lateral legs, form a generally U-shaped push handle. In this embodiment of the present invention, the crossbar can be made so that it can be disconnected, at one of its ends, from the upper end of one of the lateral legs, and then pivoted substantially 180° so that it extends laterally with respect to the occupant compartment. The lateral leg from which it then extends at 90° with respect to, can also be pivotally attached to the stroller structure. It can be disposed for pivoting from its original rearwardly-extending orientation in a forward direction so that the crossbar can be moved to a position forward of the rearward end of the occupant compartment and, preferably, closer to the forward end of the occupant compartment than it is to the rearward end of the occupant compartment.

In another embodiment, in which both a push handle of conventional construction and a motive handle in accordance with the present invention are utilized, the motive handle can employ a riser portion which is pivotally attached to one of the lateral legs. The riser portion, mounting the handgrip portion as previously discussed, can be disposed for pivoting in an intended direction of movement of the stroller and maintenance in various positions through its swing. In order to accomplish pivoting and maintenance of the motive handle in this embodiment, a short arm, mounted at a proximal end thereof to the lateral leg of the push handle can be provided with a sleeve disposed for pivoting at its distal end. The sleeve can slide up and down the motive handle riser portion to allow pivoting of the motive handle. Means can be provided to lock the sleeve at a desired location along the riser portion in order to position the handgrip portion at the desired height.

The invention also envisions a motive handle which is retrofitted to an existing stroller structure and attached thereto by any appropriate means. Such a retrofitted stroller can, of course, include many of the features discussed hereinbefore.

The present invention is thus an improved baby carriage and adapter handle therefor. More specific structural details and advantages obtained in view of those details would become apparent with reference to the DETAILED DESCRIPTION OF THE INVENTION, appended claims and accompanying drawing figures.

DETAILED DESCRIPTION OF THE INVENTION

Figure 1:
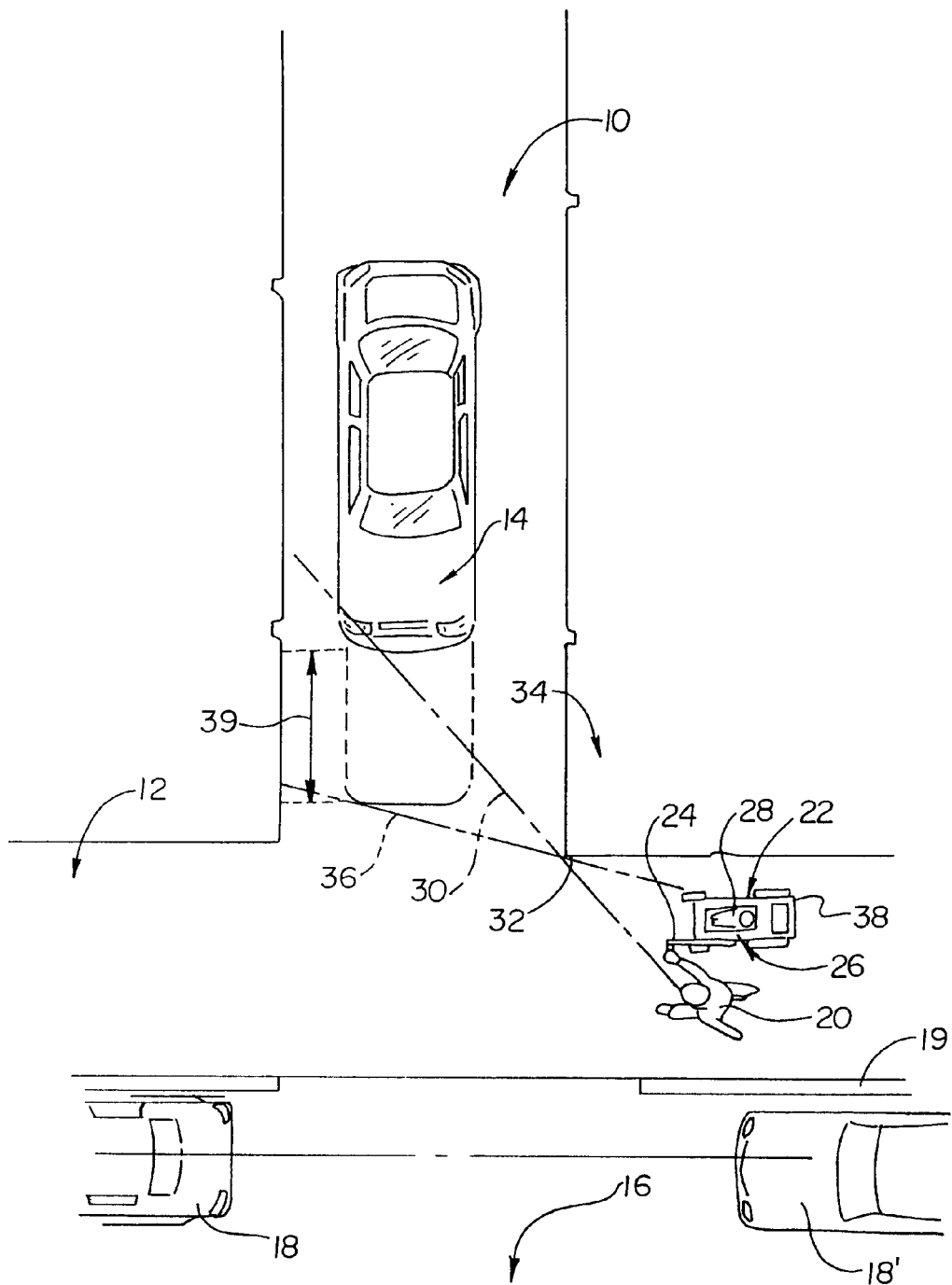
FIG. 1 is a top view of an alleyway intersecting a sidewalk which illustrates lines of sight and the advantages obtained in view of the present invention.

Referring now to the drawings, wherein like reference numerals denote like elements throughout the several views, FIG. 1 illustrates an intersection between an alleyway 10 and a sidewalk 12. The figure illustrates an automobile 14 exiting the alleyway 10 and onto a street 16 with various other automobiles 18, 18' parked at the curb 19. A stroller attendant 20 pushing a baby carriage 22 is walking along the sidewalk 12.

In FIG. 1, the stroller attendant 20 is illustrated as pushing the stroller 22 employing a motive handle 24 in accordance with the present invention. As is able to be seen, because of the location of the handle 24, the attendant 20 is approximately abreast a front end of the occupant compartment 26 in which a child 28 is positioned. As a result of the attendant's being at this location, his line-of-sight 30 around the corner 32 of a building 34, which would normally obscure view of the approaching automobile 14, penetrates relatively deeply into the alley 10, and the car 14 can be seen well before it enters the intersection of the alley 10 with the sidewalk 12.

FIG. 1 also illustrates an alternative line-of-sight 36 which would be operative if the stroller attendant 20 were in a position rearward of the stroller 22 and employing a traditional push handle 38. As can be seen, if the attendant 20 were in this position, he would not perceive the approach of the automobile 14 from the alley 10 until the automobile 14 were almost in the intersection of the alley 10 with the sidewalk 12. As a result, and also in view of the fact that the automobile driver is displaced rearwardly from the front extremity of his vehicle 14 and his view is also obscured by the corner 32 of the building 34, a collision between the car 14 and the stroller 22 might occur. Serious injury or death could result. By displacing the position of the attendant 20 forwardly by using a handle 24 in accordance with the present invention, significantly safer operation of the stroller 22 can result, since the attendance 20 will be able to see the automobile at a distance illustrated by arrow 39 farther back in the alleyway 10.

FIGS. 2–7 illustrate, in most cases, a conventional stroller 22 of the type having a frame 40 with a plurality of side stanchions 42 which support a sling-type seat 44. The side stanchions 42, in a typical stroller 22, are articulated relative to one another to enable the stroller 22 to be collapsed for storage. Means (not shown) are typically utilized to lock the frame 40 in an open configuration during use. When the frame 40 is opened, the sling 44 is stretched substantially taut.

The frame 40 is shown as being supported by forward, caster wheels 46 and aft wheels 48 which are fixed to define generally parallel planes as they rotate. The wheels 46, 48, of course, enable movement of the stroller 22 over a ground surface.

The stroller 22 is also shown as having a protective bar 50 at the forward end 52 of the occupant compartment 26. Such a bar 50 serves to define, along with an upwardly-extending portion 54 of the sling seat 44, openings 56 through which the legs of the child 28 can be inserted. The stroller 22 is also shown as including a backrest portion 58. In many strollers, the angle of inclination of the backrest 58 can be varied.

Figure 2:
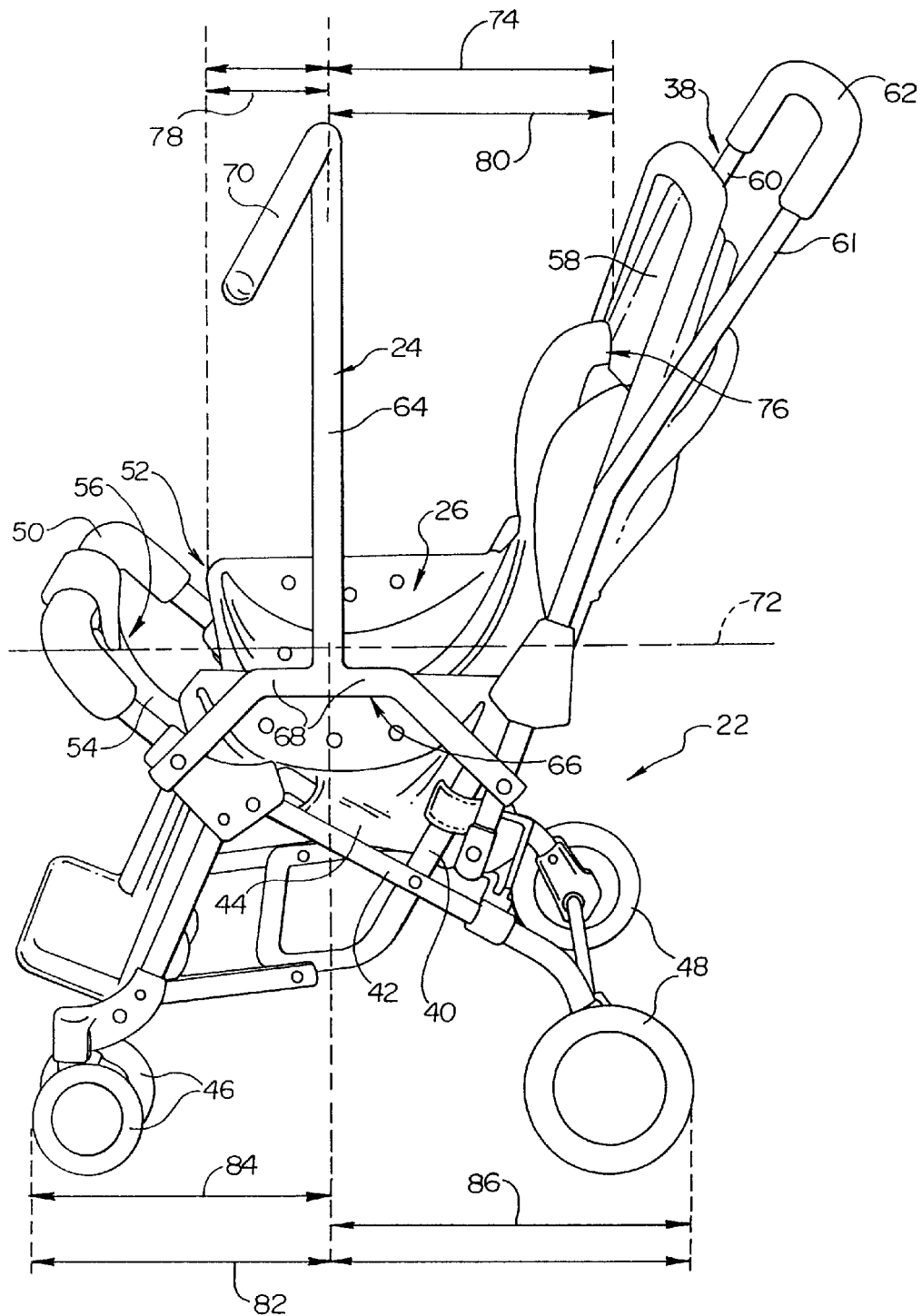
FIG. 2 is a side perspective view of a stroller retrofitted with a motive handle in accordance with the present invention.

The stroller 22 in FIG. 2 is also shown as having a conventional push handle 38. The push handle 38 is generally U-shaped in construction and includes a pair of lateral legs 60, 61 which extend upwardly and rearwardly from the occupant compartment 26. The lateral legs 60, 61 are intersected, at their upper ends, by a crossbar 62.

FIG. 2 illustrates a rudimentary motive handle 24 adapter in accordance with the present invention. The handle 24 includes a riser portion 64 which extends upwardly from a base 66. The base 66 is shown as having a pair of struts 68, each of which is pinned to the side of the stroller frame 40. It will be understood, however, that affixation of the motive handle 24 to the stroller frame 40 can be accomplished in any appropriate manner.

The riser portion 64, at its upper, distal end, mounts a handgrip portion 70. The handgrip portion 70 extends laterally with respect to the occupant compartment 26 and enables the attendant 20 to push the stroller 22 from a location along the side. FIG. 2 illustrates a handgrip portion 70 which is linear and oriented at 90° relative to the riser portion 64. It will be understood that, while the embodiment shown in FIG. 2 does not enable height adjustment of the handgrip portion 70, height adjustment embodiments do exist as will be discussed hereinafter.

As shown in FIG. 2, the handgrip portion 70 is oriented generally perpendicular to a fore-and-aft axis 72 of the occupant compartment 26. Such an orientation enables the attendant 20 to maximize the pushing effect imparted to the stroller 22.

FIG. 2 illustrates, by line 74, the distance between the forward end 52 of the occupant compartment 26 and the after end 76 of the occupant compartment 26. FIG. 2 illustrates positioning of the handgrip portion 70 of the motive handle 24 at a fore-and-aft location such that it is substantially closer to the forward end 52 of the compartment 26 than the after end 76. Arrow 78 represents the distance from the handle 24 to the forward end 52, and arrow 80 represents the distance from the handle 24 to the aft end 76 of the compartment 26. The lengths of these distances, as shown, define a ratio of approximately 1:2. FIG. 2 also illustrates, by line 82, the distance between the front extremity of caster wheels 46 and the rear extremity of rear wheels 48. With handle 24 mounted as shown in FIG. 2, positioning of the handgrip portion 70 of motive handle 24 is at a fore-and-aft location such that it is closer to the forward extremity of caster wheels 46 than it is to the after extremity of the rear wheels 48. Arrow 84 represents the distance from the handle 24 to the forward extremity of the caster wheels 46, and arrow 86 represents the distance from the handle 24 to the after extremity of the rear wheels 48. The lengths of these distances, as shown, define a ratio of approximately 4:5. It will be understood, however, that, even when the retrofit handle, as illustrated in FIG. 2, is not adjustable, it can be manufactured such that it could be positioned even farther forward than as shown.

Figure 3:
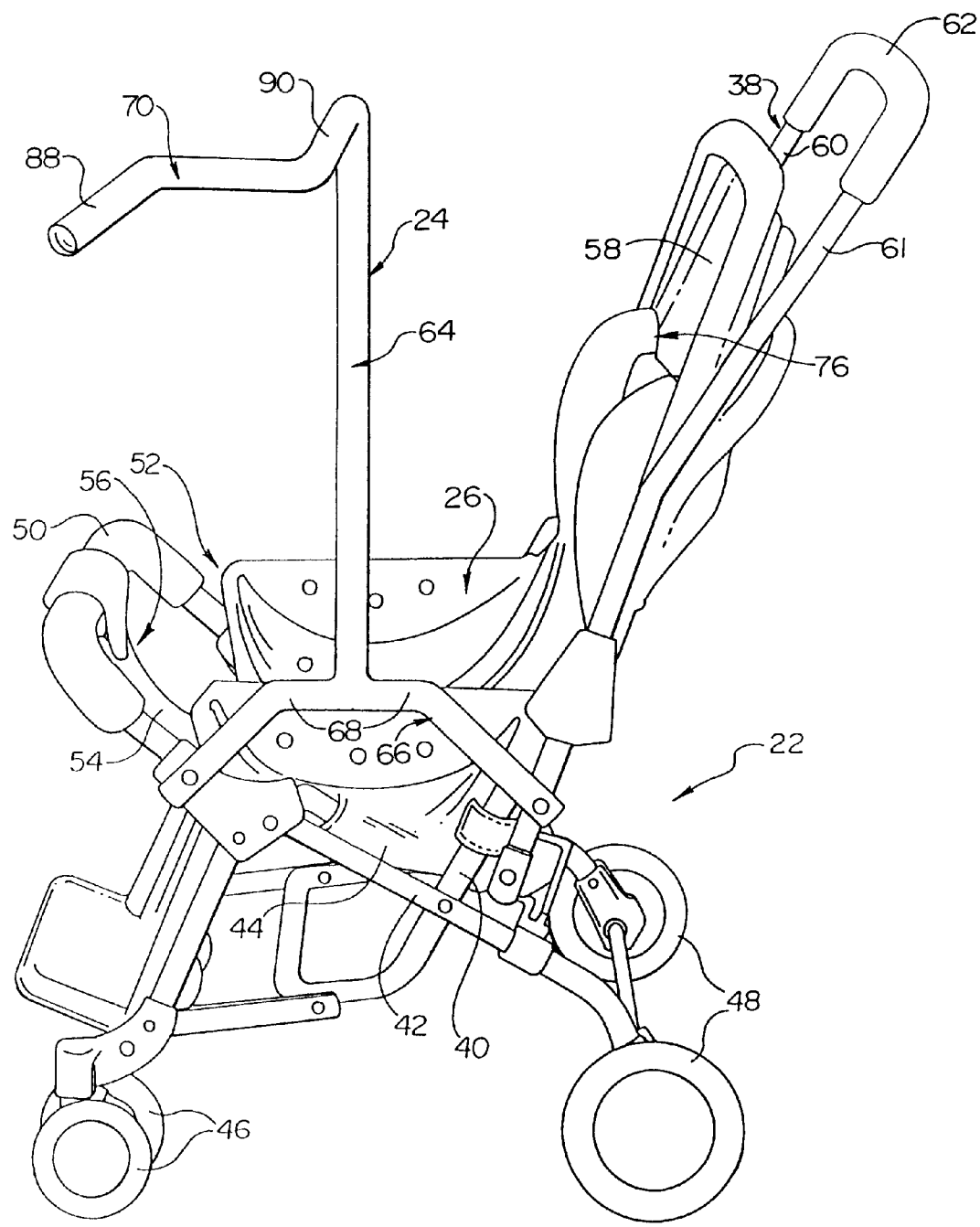
FIG. 3 is a view similar to FIG. 2 showing an alternative embodiment of the retrofitted motive handle.

FIG. 3 shows a motive handle 24 similar to that of FIG. 2. In FIG. 3, however, the handle 24 includes a handgrip portion 70 which has a distal segment 88 stepped with respect to a proximal segment 90 at the riser portion 64 of the handle 24. The distal portion 88 is stepped forwardly in a generally horizontal plane to enable the stroller attendant 20 to be positioned even farther forward than in the case of the adapter of FIG. 2.

Figure 5:
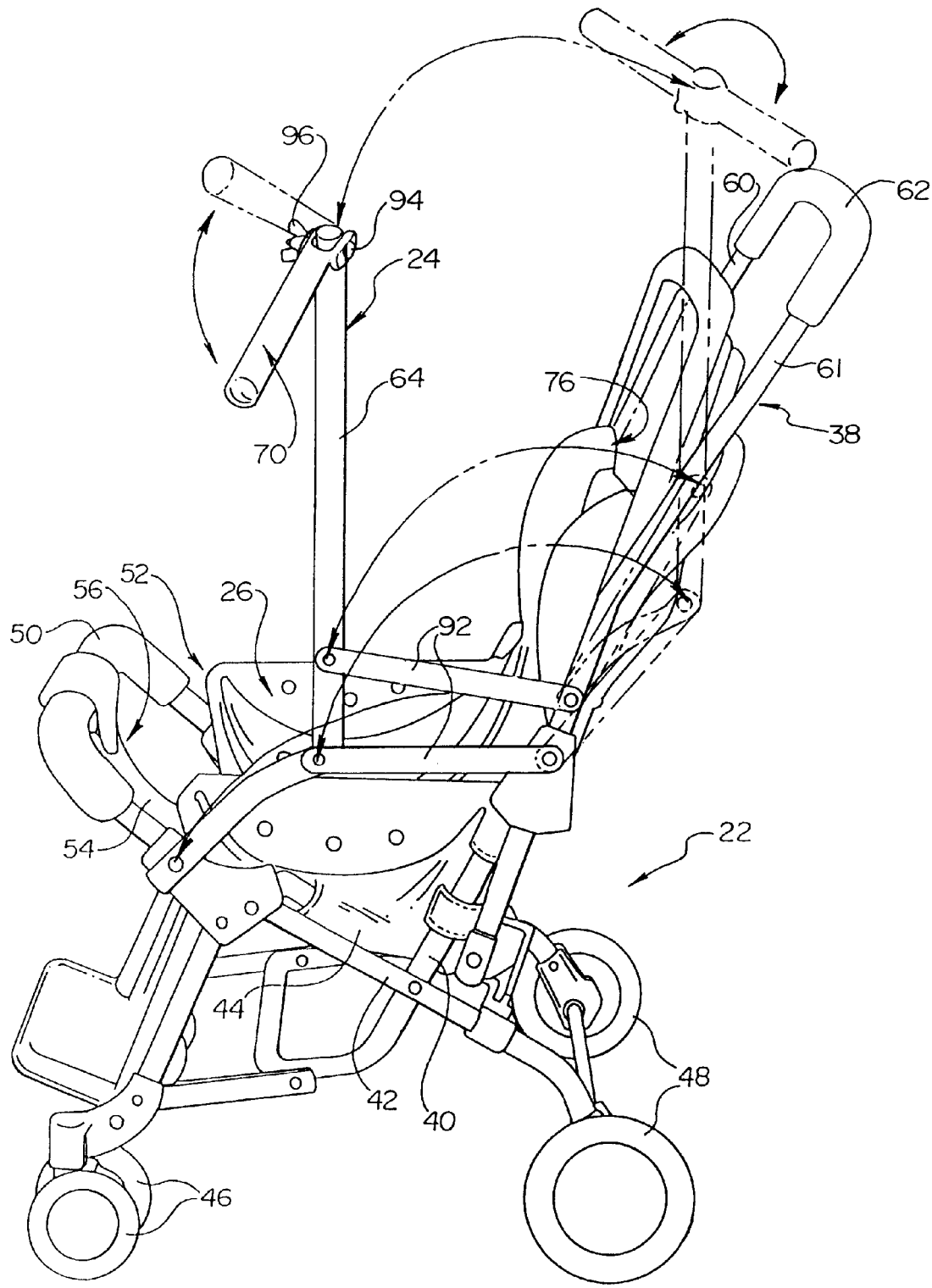
FIG. 5 is a view similar to FIGS. 2–4 illustrating a motive handle which collapses when the frame of the stroller is folded up.

FIG. 5 is similar to FIGS. 2 and 3. In this embodiment of the motive handle, however, the handle 24 can be substantially permanently attached to the frame 40 of the stroller 22. The motive handle 24 is constructed employing members 92 defining a generally pivotable parallelogram figure so that, as the stroller frame 40 is folded for storage, the motive handle 24 can similarly be folded while remaining attached to the stroller frame 40.

FIG. 5 also illustrates a handgrip portion 70 of the handle 24 as being pivotally attached to the riser portion 64 at the upper, distal end of the riser portion 64. Pivotability is shown as being provided by means of a bolt 94 passing through the intersection of the handgrip portion 70 and riser portion 64 which can be tightened down by a wing nut 96 to maintain the handgrip portion 70 in a relative orientation with respect to the riser portion 64. It will be understood, however, that any appropriate means can be utilized to effect pivotability and relative position maintenance. By affording this pivotability feature to the invention, the handgrip portion 70 can be pivoted out of the way during storage of the stroller 22.

Figure 6:
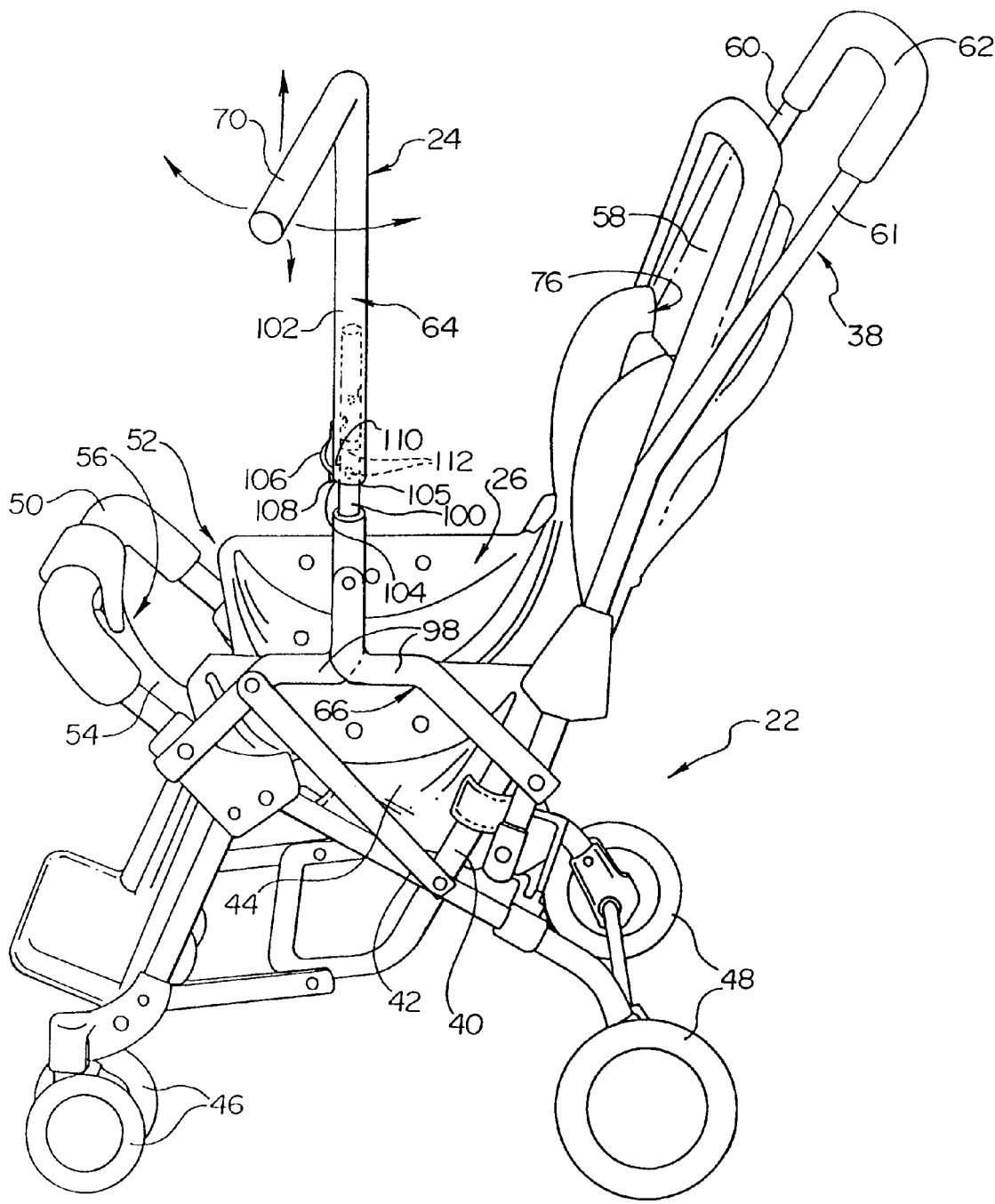
FIG. 6 is a view similar to FIGS. 2–5 illustrating a collapsible motive handle and a telescoping riser portion thereof.

FIG. 6 shows another embodiment of the motive handle. In this embodiment, the base 66 of the handle 24 is, again, formed by a plurality of struts 98 to enable collapsing of the handle 24 along with folding of the stroller 22.

The handle embodiment of FIG. 6 illustrates a rigid relationship between the handgrip portion 70 and the riser portion 64 of the handle 24. It will be understood, however, that pivotability between the two portions can be afforded.

The embodiment of FIG. 6, however, shows a telescoping feature of the riser portion 64. Male and female segments 100, 102 of the riser portion 64 are utilized to accomplish this feature. A wall 105 of the female portion 102 is provided with an aperture 104, and a leaf spring 106 is mounted, by its proximal end, to the outside of this wall 105. The distal end 108 of the leaf spring 106 is provided with a pin 110. The pin 110 is carried by the leaf spring 106 in a manner so that it extends inwardly through the wall 105 of the female portion 102 through the aperture 104 therein. The leaf spring 106 is angled relative to the female segment 102 of the riser 64 so that a bias is placed upon the pin 110 to urge the pin 110 through the aperture 104 and inwardly therebeyond.

The male segment 100 of the riser portion 64 has, formed in an outer surface thereof, a plurality of axially-spaced and aligned dimples 112. The dimples 112 so positioned are formed in the surface of the male segment 100 such that, when the male segment 100 is rotationally oriented relative to the female segment 102 so that a contoured tip of the pin 110 impinges upon one of the dimples 112, the handgrip portion 70 of the handle 24 extends generally perpendicular to the side of the stroller 22.

Additional dimples (not shown) can, if desired, be formed in the outer surface of the male segment 100 which can be angularly spaced relative to the axially-aligned dimples 112. By providing this construction, the handgrip portion 70 can be made to rotate in a horizontal plane to afford angular variations in accordance with the attendant's desires.

Figure 4:
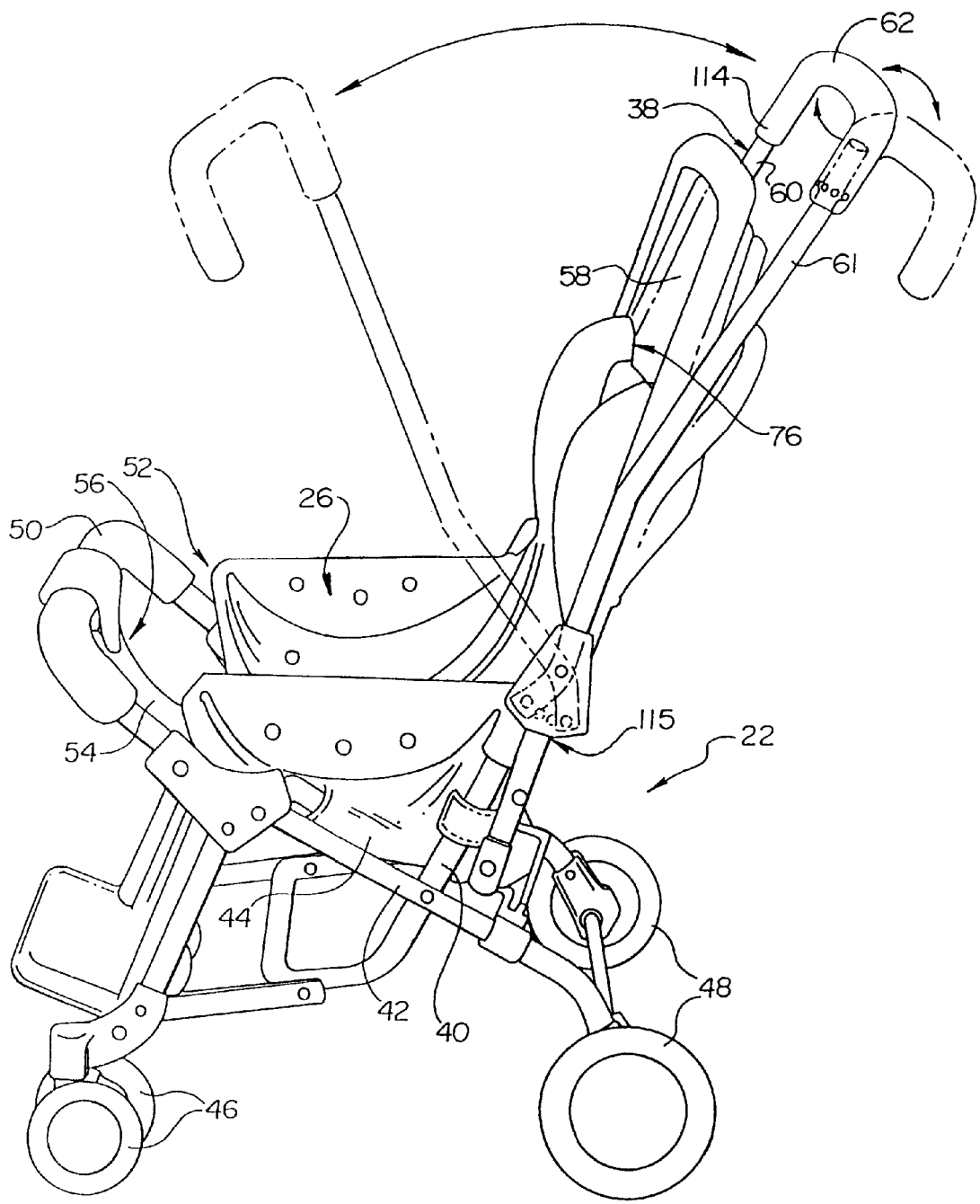
FIG. 4 is a view similar to FIGS. 2 and 3 illustrating the conversion of a conventional push handle to function as a motive handle in accordance with the present invention.

FIG. 4 illustrates an embodiment of the invention which employs a conversion of the traditional U-shaped push handle 38. In this embodiment, one end 114 of the crossbar 62 can be disconnected from the corresponding lateral leg 60 of the handle 38. The crossbar can 62, in turn, be pivoted with respect to the other lateral leg 61 in order to enable it to be rotated approximately 180° so that it extends laterally from the stroller 22 in order to enable lateral displacement of the attendant 20 during the pushing function. In order to enable displacement of the attendant 20 forwardly, the lateral leg 61 to which the crossbar 62 maintains connection can be pivotably disposed for movement to an angularly more forward position. Appropriate means (such as at 115) can be provided to maintain the lateral leg 61 in the desired angular position. Any appropriate means can be employed for this purpose. Options are ball-detent/dimples, pin/registered apertures, etc.

Figure 7:
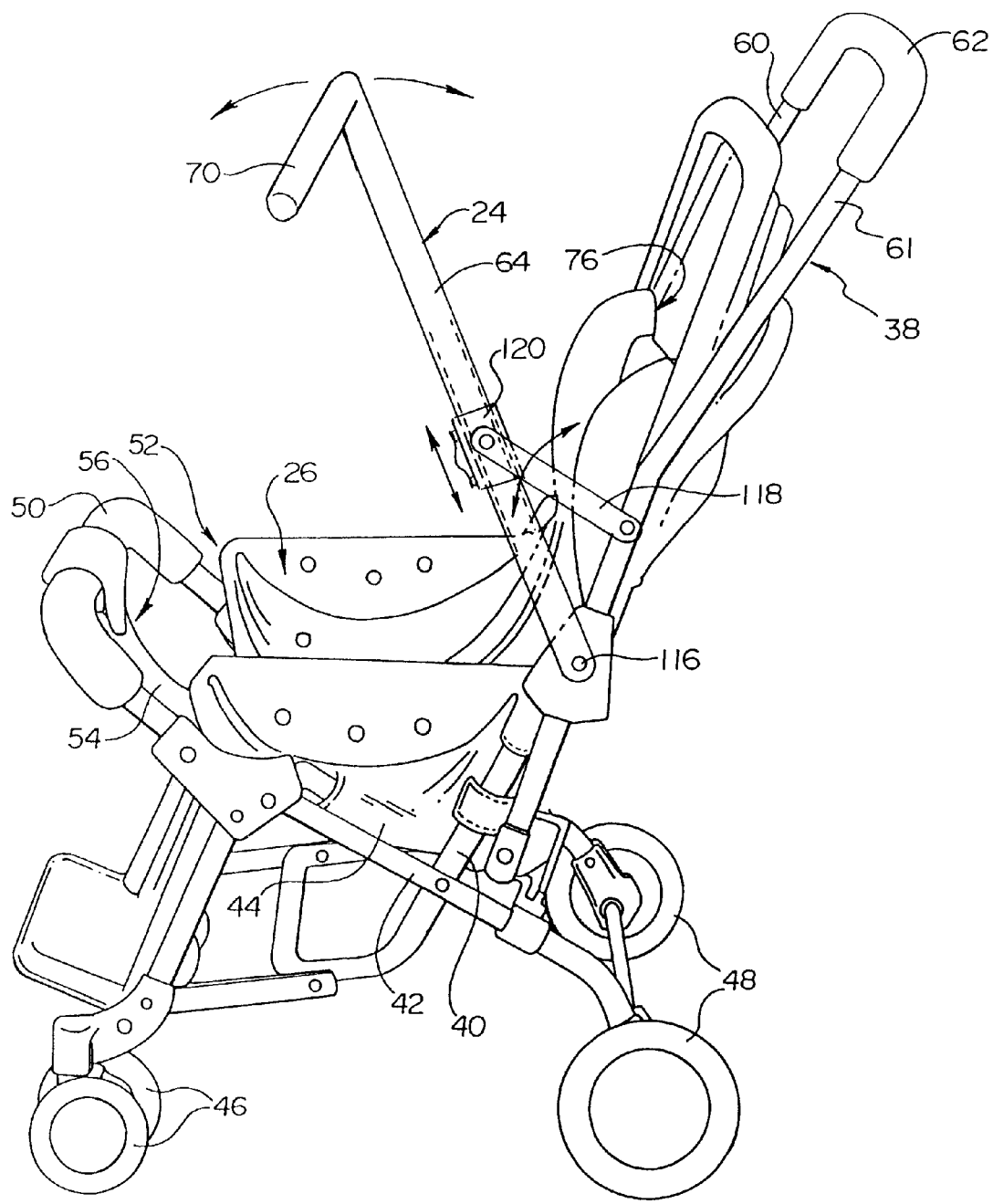
FIG. 7 is a view similar to FIGS. 2–6 illustrating an embodiment of the invention wherein the position of the motive handle can be adjusted.

FIG. 7 illustrates a still further embodiment. In this embodiment, the motive handle 24 is employed in combination with the traditional U-shaped push handle 38. In fact, the motive handle 24 is mounted to one of the lateral legs 61 of the push handle 38.

FIG. 7 illustrates a motive handle 24 which is pivotally mounted at a location (as at 116) along the lower portion of the lateral leg 61. It might be desirable to mount the motive handle 24 in this pivotable fashion with a degree of permanence. This would be particularly true where the handgrip portion 70 of the handle 24 is pivotable downwardly relative to the riser portion 64, although FIG. 7 does not illustrate this pivotability between the two portions of the motive handle.

FIG. 7 shows an arm 118 mounted at its proximal end to the lateral leg 61 of the push handle 38 at a location upwardly from where the motive handle 24 is mounted. A distal end of the arm 118 pivotally mounts a sleeve 120 which captures the riser portion 64 of the motive handle 24. Means can be provided, such as those previously discussed with regard to telescoping of the riser portion 64, to maintain the sleeve 120 in position relative to the length of the riser portion 64. As will be able to be seen then, the motive handle 24 will be able to be positioned, when the maintaining means is disengaged, at any angular position defined through the swing of the motive handle forwardly. The motive handle 24 will be able to move forwardly to a desired position and then locked at that location. It will be understood that any appropriate maintenance means can be employed.

It will be understood that this disclosure, in many respects, is only illustrative. Changes may be made in details, particularly in matters of shape, size, material, and arrangement of parts without exceeding the scope of the invention. Accordingly, the scope of the invention is as defined in the language of the appended claims.

What is claimed is:

1. A manually pushed vehicle, comprising:
   (a) an occupant compartment having opposite sides and, spaced along a fore-and-aft axis of said occupant compartment, a first end positioned forwardly with respect to an intended direction of movement of the vehicle and a second end positioned rearwardly with respect to an intended direction of movement of the vehicle;
   (b) means supporting said occupant compartment for movement over a surface; and
   (c) a push handle including at least one lateral leg positioned along a lateral side of the occupant compartment and extending upwardly and rearwardly with respect to said occupant compartment and a crossbar extending transversely between two laterally spaced, longitudinally extending planes formed by said opposite sides of said occupant compartment and attached to an upper end of the lateral leg, said crossbar being able to be pivoted substantially 180° to extend laterally and outwardly with respect to said occupant compartment and said lateral leg, and said lateral leg, at an upper end of which said crossbar is disposed, being able to be pivoted forwardly to position said crossbar forward of said second end of said occupant compartment.

2. A vehicle in accordance with claim 1 further comprising a frame of said vehicle, said frame receiving said occupant compartment within a perimeter thereof and being collapsible, said push handle being secured to said frame and being configured to collapse with said frame.

3. A child stroller, comprising:
   (a) a frame receiving an occupant compartment within a perimeter defined by said frame, said occupant compartment having opposite sides and, spaced along a fore-and-aft axis of said occupant compartment, a first end positioned forwardly with respect to an intended direction of movement of the stroller, and a second end positioned rearwardly with respect to an intended direction of movement of the stroller;
   (b) means supporting said occupant compartment for movement over a surface; and
   (c) a push handle including at least one lateral leg positioned along a lateral side of the occupant compartment and extending upwardly and rearwardly with respect to said occupant compartment and a crossbar extending transversely between two laterally spaced, longitudinally extending planes formed by said opposite sides of said occupant compartment in a first position relative to said lateral leg and attached to an upper end of said lateral leg, said crossbar being able to be pivoted substantially 180° to extend laterally and outwardly with respect to said occupant compartment to define a second position relative to said lateral leg, and said lateral leg, at an upper end of which said crossbar is disposed, being able to be pivoted forwardly to position said crossbar forward of said second end of said occupant compartment.

4. A child stroller in accordance with claim 3 wherein said lateral leg at an upper end of which said crossbar is disposed is able to be pivoted forwardly to position said crossbar closer to said first end of said occupant compartment than to said second end of said occupant compartment.

5. A child stroller in accordance with claim 3 wherein said push handle is generally U-shaped and includes a pair of lateral legs extending upwardly and rearwardly with respect to said occupant compartment, one on each side thereof, and wherein said crossbar is pivotally connected to one of said lateral legs at an upper end thereof for movement between said first position, interconnecting upper ends of said lateral legs, and said second position.

* * * * *